Nov. 19, 1957 W. H. HAMILTON 2,814,028
SIGNALLING SYSTEM FOR TAXI CABS
Filed Jan. 19, 1955 2 Sheets-Sheet 1

INVENTOR.
WILL H. HAMILTON
BY
ATTORNEY

Nov. 19, 1957  W. H. HAMILTON  2,814,028
SIGNALLING SYSTEM FOR TAXI CABS
Filed Jan. 19, 1955  2 Sheets-Sheet 2

INVENTOR.
WILL H. HAMILTON
BY Louis Necho
ATTORNEY

United States Patent Office 2,814,028
Patented Nov. 19, 1957

2,814,028
SIGNALLING SYSTEM FOR TAXI CABS

Will H. Hamilton, Haddonfield, N. J., assignor to Yellow Cab Company of Philadelphia, Philadelphia, Pa., a corporation of Pennsylvania Application January 19, 1955, Serial No. 482,819

2 Claims. (Cl. 340—68)

In the operation of a taxi cab it is desirable (1) that a cab be clearly visible at a distance; (2) that if a cab is not available notice to that effect and the reason therefore be given to the public; and (3) that one or another of the states mentioned be indicated at all times as long as the cab is in operation as distinguished from the time when the cab is in storage.

It is therefore the object of the invention to produce a signalling system which will meet all of the above enumerated requirements.

A further object is to produce an improved signalling system of the type set forth which is inexpensive to produce and install and one which is simple to operate.

The full nature of the invention will be understood from the following specification and the accompanying drawings in which.

Figure 1:
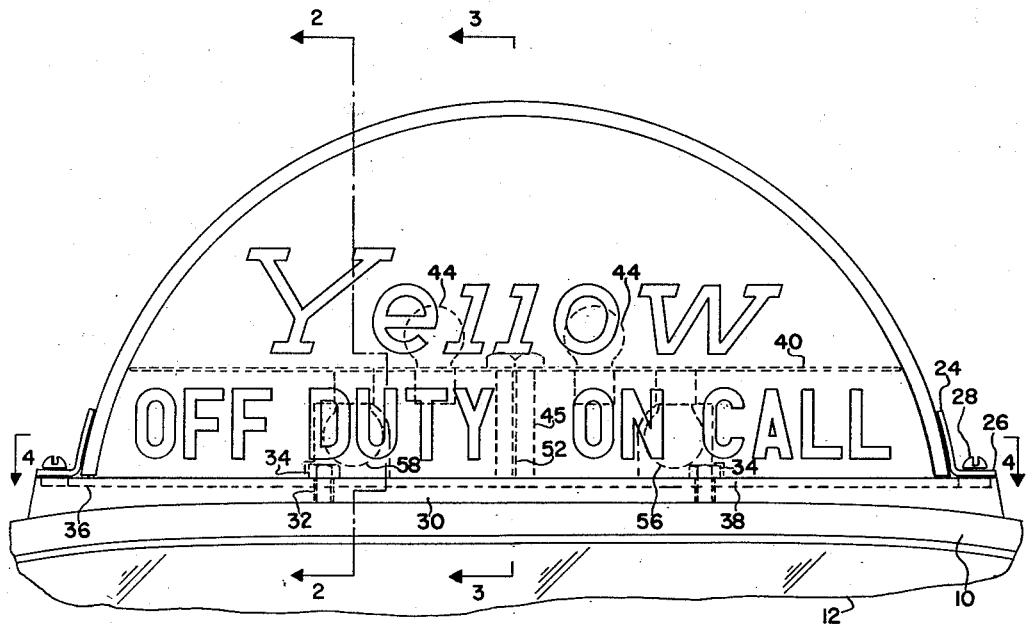
Fig. 1 is a fragmentary, front elevational view of the top of a taxi cab equipped with a signalling system embodying my invention.
Figure 5:
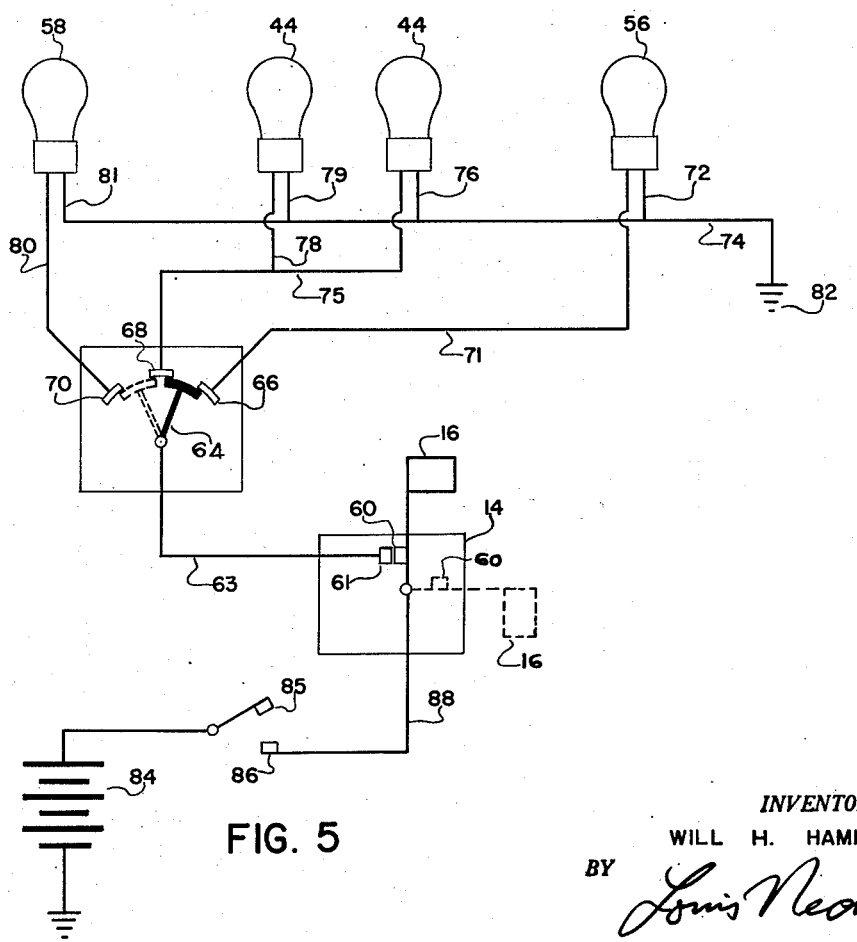
Fig. 5 is a diagrammatic view showing the circuit energizing the signalling system.

In Fig. 1 there is shown a portion of the roof 10, and a portion of the windshield 12 of a conventional taxi cab of the type provided with a meter 14 and a switch 16, commonly referred to as the "flag" which is moved to one position, such as the lower, broken line position of Fig. 5 to set the meter in operation at the beginning of the lift and to the upper, solid line position to deactivate the meter at the end of the trip. These parts are conventional and are therefore not shown nor described in detail. Conventionally a cab is also provided with a transparent dome which is lit up when the cab is vacant and which is dimmed or darkened when the cab is in use. This dome is placed at the top of the cab in about the manner shown in Fig. 1. Conventionally, each cab is also provided with a separate sign one side of which reads "off duty" and the other side of which reads "answering a call" which sign is displayed against the windshield by the driver as he sees fit. Such an arrangement is not desirable because a prospective customer sees a cab at a distance and, because its dome is lit, he assumes it is available and runs to intercept it only to find the cab displaying the "off duty" or "on call" sign. Furthermore, a driver can abuse the "on call" or the "off duty" sign. For example, when a driver is in a poor neighborhood, or if it is near the end of his shift and therefore he does not wish to take on a fare, he may use one sign or the other even tho he is not, in fact, off duty nor on call. In conventionally equipped cabs these actions of the driver can not be readily detected by an inspector cruising at some distance.

Figure 2:
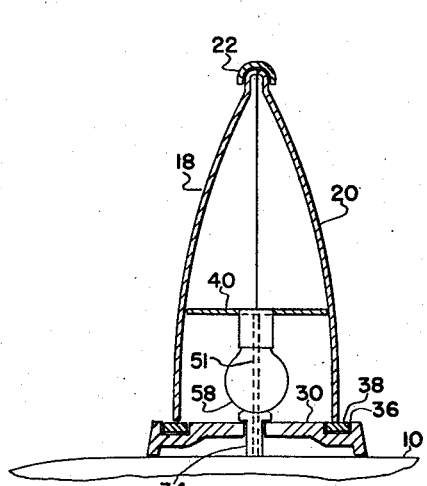
Fig. 2 is a sectional view on line 2—2 on Fig. 1.
Figure 3:
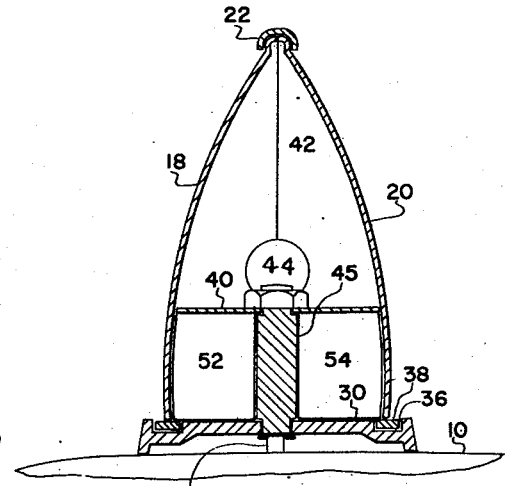
Fig. 3 is a sectional view on line 3—3 on Fig. 1.
Figure 4:
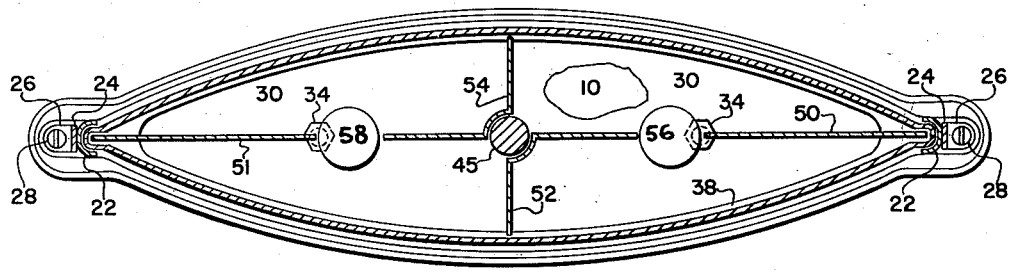
Fig. 4 is a view, partly in horizontal section and partly in top plan, looking in the direction of line 4—4 on Fig. 1.

To overcome these defects, I have devised the structure and system illustrated which includes a dome formed of two parts 18 and 20, which are of the general shape shown in Figs. 1 to 4 and on each of which is inscribed the word "Yellow" or whatever name or symbol desired. In this connection it is pointed out that the word "Yellow" or other symbol is inscribed in colors which contrast with the dome so as to be clearly visible under normal operating conditions. The meeting edges of dome sections 18 and 20 are encased and held together by a metal clip 22. Each end of clip 22 is provided with an angle the vertical part 24 of which is suitably secured to the end of clip 22 and the horizontal part 26 of which is secured by screw 28 to a base 30. The base 30 is of the general shape shown in Fig. 4 and is provided with holes 32 for receiving bolts 34 by means of which the base is secured to the top 10 of the cab. The base 30 is provided with a groove 36 for receiving the bottom edges of dome sections 18 and 20 and to prevent breakage and to permit formation of a weather-tight joint, a rubber gasket 38 is interposed between the bottom edges of the dome sections and the groove as best shown in Figs. 2 and 3. The interior of the dome is divided, by a horizontal partition 40, to provide an upper compartment 42 which encloses one or more bulbs 44. The plate 40 is supported on the shouldered upper end of a center post 45 the lower end of which is suitably secured to base 30 as best shown in Figs. 2 and 3. The space below partition 40 is divided, by identical vertical partitions, into identical compartments. From Figs. 3 and 4 it will be seen that the plates referred to extend from the base 30 to the underside of partition 40 and that each partition is formed of a straight piece 50 or 51 which extends from one end of the dome to center post 45, and that the inner ends of said pieces are deflected in opposite directions to form opposite walls 52 and 54 and intermediate curved portion which hug the center post as shown in Fig. 4. By this arrangement walls 50, 52 and 54 coact with base 30 and partition 40 to form front and rear compartments A and A' and walls 51, 52 and 54 coact with base 30 and partition 40 to form corresponding front and rear compartments B and B'.

Compartments A and A' are provided with a common lamp 56 and compartments B and B' are provided with a common lamp 58. As will be seen from Figs. 1 and 3, lamps 56 and 58 depend from the underside of partition 40 and lamps 44 project from the upper side of partition 40 so as to illuminate upper compartment 42. All of the compartments are light-tight with respect to each other.

From Fig. 5 it will be seen that the meter switch or flag carries a contact 60 which in the upper position of the flag, engages contact 61 which is connected by wire 63 to multi-position switch 64. In one of its positions switch 64 engages contacts 66 and 68, and in the other position thereof switch 64 engages contacts 68 and 70. When switch 64 engages contacts 66 and 68 lamp 56 is energized through wires 71, 72, 74 and ground 82 and when switch 64 engages contacts 68 and 70 lamp 58 is energized through wires 80, 81, 74 and ground 82. It is to be noted that "off duty" and "on call" are so inscribed on the portions of front wall 18 which correspond to compartments A and B so that one or the other of these signals will be illuminated depending on which of lamps 56 and 58 is energized. In both positions of switch 64 upper lamps 44 are energized through wires 75, 78, 79, 76 and 74, to light upper compartment 42. Contact 60 is connected by wire 88 to contact 86 of a switch the other contact 85 of which is connected to the battery 84 in the usual way. Preferably, switch 85, 86 is the ignition switch of the cab and the arrangement is such that when switch 85, 86 is open, the entire system is de-energized.

By the foregoing arrangement, lamps 44 and lamp 56 or lamps 44 and lamp 58 will be energized as long as the switch 85, 86 is closed, which is as long as the cab is in use. When contacts 60 and 61 are disengaged it means the cab is occupied and all the signal lights are de-energized.

By this arrangement, the driver cannot put out all the signal lamps because then the meter will run and, unless the driver has a fare in the cab, he will have to pay the sum indicated by the meter.

Also, when the flag is up and the meter is not running, either the "off duty" or the "on call" sign will be illuminated and this will enable a supervisor to note the sign at a distance and then check with the dispatching office to see whether in fact, the driver was off duty or was actually answering a call. In other words, my signalling system is not only more convenient to the operator and to the public, but it also makes it easier for the cab owner to control the action of the driver.

If desired, switch 64 can be moved further to the right, as viewed in Fig. 5 so as to engage contact 66 only, or further to the left so as to engage contact 70 only. This enables the driver to turn off lamps 44 but, in that case lamp 56 or lamp 58 will be energized. It will be understood the arrangement of contacts 66, 68 and 70 is such, and that switch 64 is of the spring loaded or toggle type so that it cannot be moved to a position intermediate any of the contacts thus making it impossible for the driver to turn off lamps 44, 56 and 58 at one time except when the meter is running.

What I claim is:

1. A signalling system for a taxi cab of the type which includes a mileage meter and a mileage meter control switch movable to a first position in which it activates said meter and to a second position in which it deactivates said meter, said signalling system comprising a substantially transparent elongated casing adapted to be mounted on the top of the cab, an opaque horizontal partition longitudinally dividing said casing into an upper chamber and a lower chamber, an opaque vertical partition longitudinally dividing said casing into an upper chamber and a lower chamber, an opaque vertical partition longitudinally dividing said lower chamber to form a front compartment and a rear compartment, an opaque vertical partition transversely dividing at least said front compartment to form a first section and a second section, a lamp in said upper compartment, a lamp in said first section, a lamp in said second section, an electric circuit including said meter control switch and all of said lamps, an operating switch in series with said meter control switch and operable, when said meter control switch is in its first position, selectively, to activate the lamp in said upper compartment and the lamp in said first section, or the lamp in the upper compartment and the lamp in said second section, means supplying electrical energy to said circuit through said meter control switch whereby when said meter control switch is in its second position, the leads of said operating switch is de-energized and vice versa, and an "on call" signal inscribed on the front wall of one of said sections and an "off duty" signal inscribed on the front wall of said second sections, said "on call" and "off duty" being invisible by externally reflected light.

2. The structure recited in claim 1 in which said circuit is so arranged that, at least the lamp in one of said sections or the other will be energized whenever the meter control switch is in its first position regardless of the position of said operating switch.

References Cited in the file of this patent

UNITED STATES PATENTS

| 1,780,780 | Costuma et al. | Nov. 4, 1930 |
| 1,857,210 | Nelson et al. | May 10, 1932 |
| 2,747,173 | Howarth | May 22, 1956 |

FOREIGN PATENTS

| 186,097 | Great Britain | Sept. 28, 1922 |